United States Patent [19]

Ohara et al.

[11] Patent Number: 4,534,633
[45] Date of Patent: Aug. 13, 1985

[54] DELAY MECHANISM FOR SINGLE REFLEX CAMERA

[75] Inventors: Tsunemasa Ohara, Tokyo; Masayuki Suzuki; Masayoshi Yamamichi, both of Kanagawa, all of Japan

[73] Assignee: Canon Kabushiki Kaisha, Tokyo, Japan

[21] Appl. No.: 452,126

[22] Filed: Dec. 22, 1982

[30] Foreign Application Priority Data

Dec. 25, 1981 [JP] Japan .................................. 56-214061

[51] Int. Cl.³ .......................... G03B 9/64; G03B 9/32
[52] U.S. Cl. .................................... 354/237; 354/242
[58] Field of Search ........ 354/242, 237, 239, 152–153, 354/256, 259, 266–267; 368/96, 97, 124, 125

[56] References Cited

U.S. PATENT DOCUMENTS 2,831,411  4/1958  Gebele .......................... 354/237 X
4,222,645  9/1980  Imura et al. ................... 354/239 X Primary Examiner—Vit W. Miska
Attorney, Agent, or Firm—Toren, McGeady, Stanger, Goldberg & Kiel

[57] ABSTRACT

A delay mechanism for a single lens reflex camera including a release member for releasing the holding member of a leading shutter curtain and a speed lowering mechanism for lowering the speed of the operation of the release member, whereby when the release member is in a range in which holding action by the holding member is to be released, the speed lowering mechanism does not impart a speed lowering effect to the release member.

2 Claims, 6 Drawing Figures

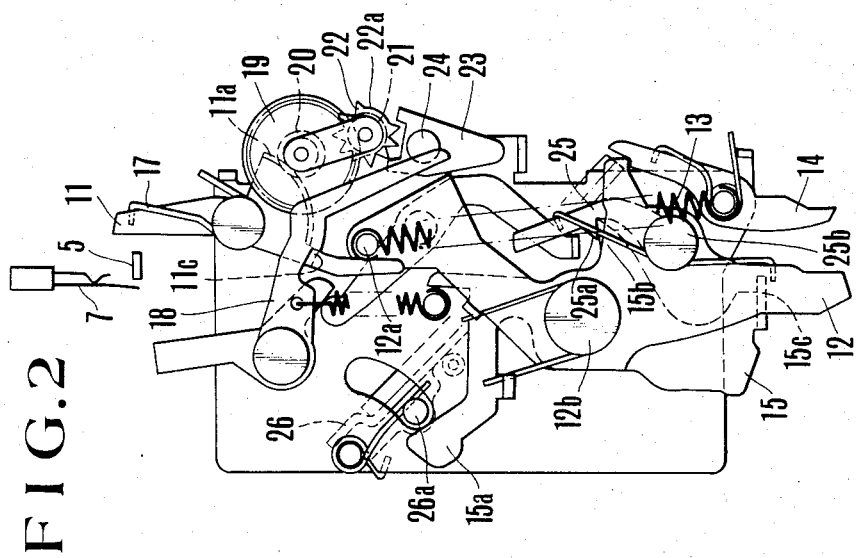
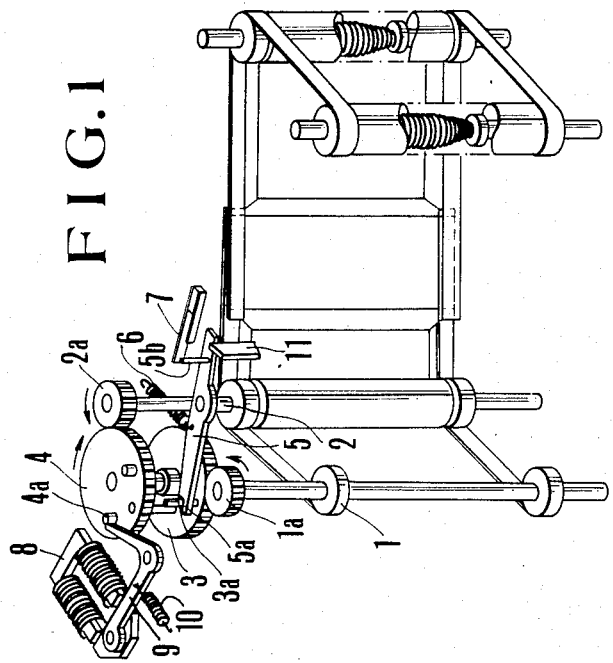

4,534,633

DELAY MECHANISM FOR SINGLE REFLEX CAMERA

The present invention relates to a delay mechanism for a single lens reflex camera having a speed lowering mechanism for controlling operation of the leading shutter curtain holding release member.

Conventional single lens reflex cameras are provided with a certain delay mechanism for releasing the leading shutter curtain (hereinafter called leading curtain) only after the camera starts the photographing operation, the camera diaphragm which defines the light transmitting aperture being closed down to a certain predetermined position by a conventional automatic diaphragm device. For example, it has been proposed that by providing a release member, which acts upon the holding member, which holds the leading curtain in the start position so as to operate to release the leading curtain, and a speed lowering mechanism, which lowers the operation speed of the release member in operative engagement with the release member, the release member starts to operate near the end of the operation of the diaphragm driving system. Normally, an electric shutter electrically controls the time between the leading shutter holding release and the tail curtain holding release so that there is a need for means for detecting the opening of the leading curtain. In the case of the electric shutter which opens the leading shutter mechanically, it is common to provide as the leading curtain opening detector an electric switch which is operated directly by the leading curtain holding member at the same time with the opening of the leading curtain.

Since the release member has a mechanism for lowering the operational speed which is provided in the detection switch in operative engagement with the leading curtain holding member, during the time between the contact of the release member with the holding member and the termination of the release action, the operation is carried out against the load of this holding member and thus the operational speed is significantly decreased. Consequently, in the event that displacement due to an assembly error, for example, takes place between the position at which the leading curtain is released by the leading curtain release member and that at which the detecting switch operates, a large difference occurs between the timing of both operations and the shutter will not be correct.

It is, accordingly, an object of the present invention to provide a delay mechanism for a single lens reflex camera which comprises a speed lowering mechanism for lowering the operational speed of the leading curtain holding release member in such a manner that, when the release member is in the range in which it releases the holding action of the leading curtain holding member, no speed lowering effect is imparted to the release member thereby to obtain an accurate time lag and insure a correct shutter time.

Other features and objects of the present invention will be clear from the description set forth hereinbelow in detail with reference to accompanying drawings showing preferred embodiments.

DESCRIPTION OF THE DRAWINGS

In the drawings:

FIG. 1 shows in perspective view a shutter device in which the delay mechanism of the present invention is applied.

FIG. 2 is a plan view which shows the mirror driving mechanism and the delay mechanism of the present invention in the set state.

BRIEF DESCRIPTION OF THE PREFERRED EMBODIMENTS

Figure 4A:
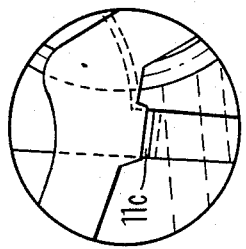
FIG. 4a is a more detailed view showing the circled part of FIG. 4 on a larger scale.

FIG. 1 shows a shutter device to which the delay mechanism of the present invention is applied which includes a leading shutter curtain shaft 1, a tail shutter curtain shaft 2, and charge gears 3 and 4, respectively, for the leading and the tail shutter curtains to be rotated by a conventional driving mechanism so as to charge the shutter via gears 1a and 2a. A leading shutter curtain holding lever 5 has an end 5a engaged with a pin 3a on the leading shutter curtain charge gear 3 so as to keep the leading shutter curtain in a charged state. On the other end of the holding lever 5, a pin 5b is provided. A tail shutter curtain control magnet 8 and a tail shutter curtain holding lever 9 are also provided. The tail shutter curtain is held in the charged position when the pin 4a on the charge gear 4 is engaged with the tail shutter curtain holding lever 9. The tail shutter curtain holding lever 9 is charged in the position shown in the drawing in operative engagement with the charge mechanism and it remains in that position as long as current flows in the tail shutter curtain control magnet 8. When the current supply to the magnet 8 is interrupted, the tail shutter curtain is holding lever 9 rotated by the force of the spring 10 so that the tail shutter curtain is no longer held. A leading shutter curtain holding release lever 11 operates near the end of the operation of the mirror and the diaphragm driving mechanism, to be explained hereinafter, so as to rotate the leading shutter curtain holding lever 5 and to release the lever 5.

In the operation of the shutter device, the leading shutter curtain is released by rotating the leading shutter curtain holding lever 5 by the leading shutter curtain holding release lever 11. At this time, a current is supplied to the tail shutter curtain control magnet 8 so as to hold the tail shutter curtain holding lever 9. At the moment at which the end of the leading shutter curtain holding lever 5 releases the leading shutter curtain, the pin 5b on the leading shutter curtain holding lever 5 opens the count switch 7. The count switch 7 is connected to a shutter control circuit (not shown), which counts with a conventional circuit composition the time until the tail shutter curtain is released and interrupts the current supply to the tail shutter curtain control magnet 8 so as to release the tail shutter curtain after the lapse of a certain determined time.

Figure 4:
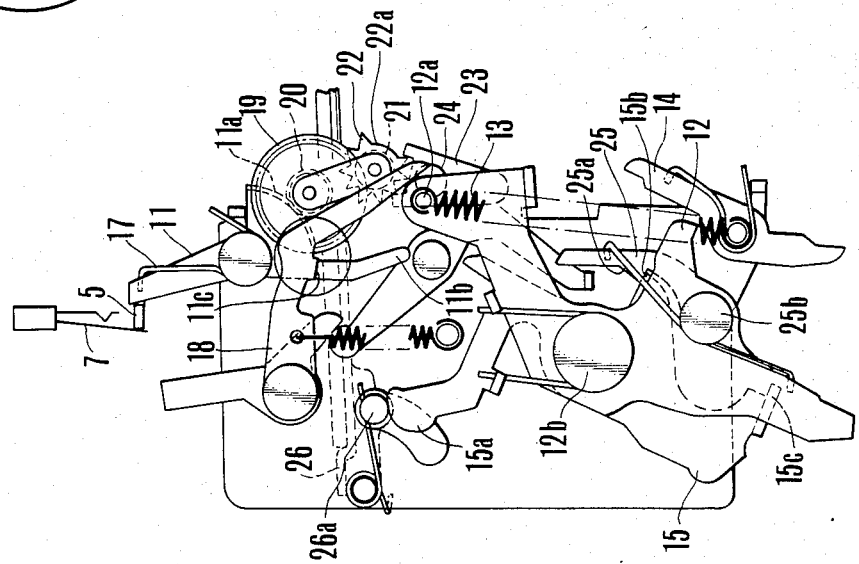
FIG. 4 is a plan view which shows the mirror up state of the mirror driving mechanism in FIG. 2.
Figure 3:
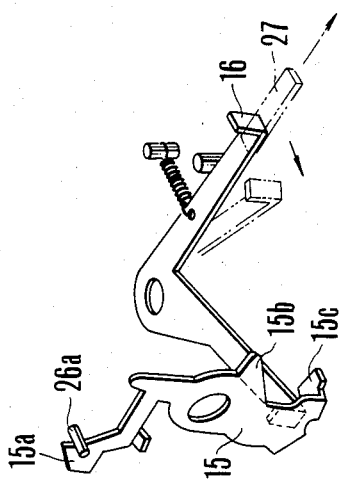
FIG. 3 is a perspective view which shows parts of the mechanism of the present invention.

In FIGS. 2 to 4, components 12–16 comprise the conventional mirror and the diaphragm driving mechanisms. 12 is an energy storing lever urged along the clockwise direction by the spring around the shaft 12b as the center and held by the holding claw 14. 15 is a mirror lifting lever linked coaxially with the energy storing lever 12, having a driving part 15a for the movable mirror 26 and a driving part 15c for the diaphragm driving lever 16. The bent part 11c of the leading shutter curtain holding release lever 11 urged by the spring 17 is engaged with the lever 18 so that the rotation of the leading shutter curtain holding lever 11 is restricted. The leading shutter curtain holding lever 11 also has a sector gear part 11a so as to be connected to a gear train 19–21. The gear 21 has a unitary escape wheel 22 which engages an anchor 23 and when the escape wheel 22 rotates, the teeth of the escape wheel 22 act upon claws 23a and 23b (seen in FIG. 5) of the anchor 23 alternatively so that the anchor 23 swings around the shaft 24 as the center. The gear ratio of the gear train 19–21 is determined in such a manner that the escape wheel 22 makes almost one rotation between the start and the stop of the operation of the leading shutter curtain holding release lever 11.

When now along with the release operation of the camera, the holding of the energy storing lever 12 by the lever 14 is released by a conventional release mechanism, such as a conventional electromagnetic release device, the energy storing lever 12 starts to rotate along the clockwise direction urged by the spring 13. The claw part 15b of the spring lever 15 is in the engaged state with the engaging part 25a of the hook 25, while the hook 25 is carried on the shaft 25b of the energy storing lever 12 so that the lever 15 rotates with the lever 12 so as to drive the movable mirror 26 and the diaphragm driving lever 16 until the raised position of the mirror shown in FIG. 4 is obtained.

When the device reaches the state shown in FIG. 4, the pin 12a of the energy storing lever 12 pushes the end of the lever 18 so as to release the holding of the leading shutter curtain holding release lever 11, the lever 11 starts to rotate along the counterclockwise direction by the urging strength of the spring 17 so as to operate the leading shutter curtain holding lever. In order to bring back the leading shutter curtain holding release lever 11 out of the state in FIG. 4 to that in FIG. 2, the energy storing lever 12 is rotated along the direction of the arrow A, shown in FIG. 5, whereby the side surface of the pin 12a pushes the part 11b so as to hold the leading shutter curtain holding release lever 11 by the charge lever 18.

Figure 5:
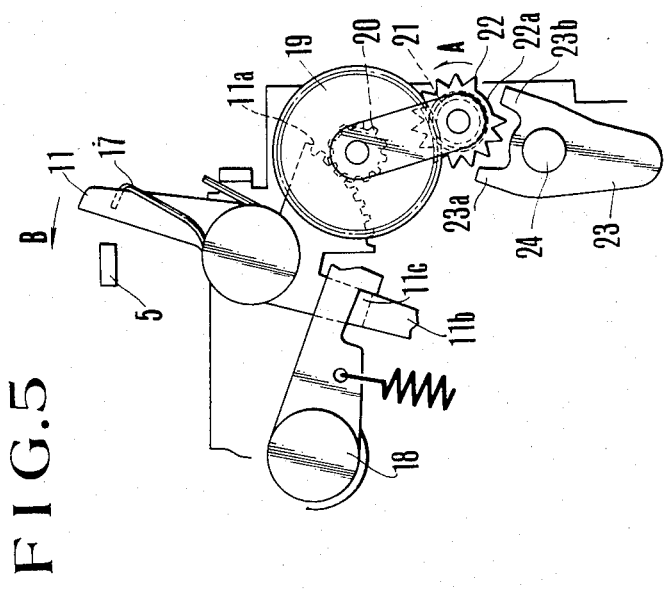
FIG. 5 is a plan view which shows an embodiment of the delay mechanism of the present invention in detail.

Below, the operation of the leading shutter curtain holding release lever 11 and that of the speed lowering mechanism of the lever 11 will be explained in detail in accordance with FIG. 5. FIG. 5 shows the leading shutter curtain holding release lever and its speed lowering mechanism in the set position. As indicated above, when released by pin 12a, the leading shutter curtain holding release lever 11 starts to rotate along the direction of the arrow B and the escape wheel 22 starts to rotate along the direction of the arrow A by the driving strength of the sector gear part 11a via the gear train 19–21. The escape wheel 22 has a gap 22a, whereby, by designing the escape wheel 22 in such a manner that, in the set state, the next tooth to the notch of the escape wheel 22 is immediately before the claw 23b of the anchor 23 as shown in FIG. 5, the anchor 23 starts to swing so as to obtain the speed lowering effect as soon as the escape wheel starts to rotate along the direction of the arrow A.

As a result, the speed of the leading shutter curtain holding release lever 11 is lowered so as to obtain the necessary time lag. When the leading shutter curtain holding release lever 11 is in a position immediately before the contact with the leading shutter curtain holding lever 5, the escape wheel 22 continues to rotate until the gap 22a engages with the claw part 23b of the anchor 23, whereby the claw part 23b of the anchor 23 falls into the notch part 22a so that the other claw part 23a does not touch the teeth of the escape wheel 22 and the anchor 23 no longer swings. Further, when along with the rotation of the leading shutter curtain holding release lever 11, the escape wheel 22 rotates and the tooth next to the notch 22a enters into contact with the claw part 23b of the anchor 23, the anchor 23 moves and the other claw part 23a falls into the notch 22a so that the anchor 23 no longer moves and the leading shutter curtain holding release lever 11 finishes the operation. After the notch part 22a of the escape wheel 22 engages with the claw part 23b, the anchor 23 does not have the speed lowering effect any more. Thus, the speed of the leading shutter curtain holding release lever 11 is not lowered any more so that a sufficient force to release the held leading curtain can be obtained. As a result, the speed at which the leading shutter curtain holding release lever 11 operates the leading shutter curtain holding lever 5 is not lowered beyond necessity and the holding can be released quickly in such a manner that the time difference between the release of the leading shutter curtain and the opening of the count switch can be made small.

As described above, in detail, the present invention relates to an electric shutter which opens the leading shutter curtain mechanically, starts to count the shutter time in operative engagement of the opening of the leading shutter curtain and opens the tail shutter curtain electromagnetically with the effect that a sufficient speed lowering effect and an exact shutter time can always be obtained for a single lens reflex camera having a release member of the holding of the leading shutter curtain with a speed lowering delay device.

While specific embodiments of the invention have been shown and described in detail to illustrate the application of the inventive principles, it will be understood that the invention may be embodied otherwise without departing from such principles.

What we claim:

1. A release device for releasing a shutter leading curtain in a single lens reflex camera, comprising:
    a holding member for holding the shutter leading curtain,
    a release member for releasing the holding of the holding member, and
    a speed reducing mechanism for reducing the operational speed of said release member, said speed reducing mechanism having an anchor and an escape wheel provided with a notched portion, and imparting a speed reducing effect to said release member through the swinging action of said anchor by said engage wheel when said release member is in an operational range where said release member does not effect the release operation, and imparting no speed reducing effect to said release member by keeping said anchor positioned in the notched portion of the escape wheel when said release member is in an operational range where said release member effects the release operation.

2. A release device according to claim 1, further comprising a count switch associated with said holding member and operative when the speed reducing effect is not imparted to said release member.

* * * * *